United States Patent
Hong et al.

(10) Patent No.: US 7,494,283 B2
(45) Date of Patent: Feb. 24, 2009

(54) HYDRODYNAMIC BEARING ASSEMBLY

(75) Inventors: Chien-Long Hong, Guangdong (CN); Ching-Hsing Huang, Guangdong (CN); Wun-Chang Shih, Guangdong (CN); Hsien-Sheng Pei, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 352 days.

(21) Appl. No.: 11/308,913

(22) Filed: May 25, 2006

(65) Prior Publication Data

US 2007/0076992 A1    Apr. 5, 2007

(30) Foreign Application Priority Data

Sep. 30, 2005    (CN)    ..................... 2005 1 0100102

(51) Int. Cl.
    *F16C 32/06*    (2006.01)
(52) U.S. Cl. ...................... 384/119; 384/115
(58) Field of Classification Search ............... 384/110, 384/107, 112, 119–121, 124, 132, 279, 289–291; 310/90
    See application file for complete search history.

(56) References Cited

U.S. PATENT DOCUMENTS

| 747,369 | A | * | 12/1903 | Bradley | ...................... 384/289 |
| 2,625,448 | A | * | 1/1953 | Underwood | ................ 384/291 |
| 4,737,673 | A | * | 4/1988 | Wrobel | ........................ 310/90 |
| 5,145,266 | A | * | 9/1992 | Saneshige et al. | ........... 384/322 |
| 5,957,589 | A | * | 9/1999 | Lee et al. | .................... 384/112 |
| 6,066,903 | A | * | 5/2000 | Ichiyama | ..................... 310/90 |
| 6,126,320 | A | * | 10/2000 | Ichiyama | .................... 384/112 |
| 6,246,136 | B1 | * | 6/2001 | Ichiyama | ..................... 310/90 |
| 6,247,848 | B1 | * | 6/2001 | Iwaki et al. | ................. 384/107 |
| 6,250,807 | B1 | * | 6/2001 | Mori et al. | .................. 384/100 |
| 6,832,853 | B2 | * | 12/2004 | Fujinaka | ..................... 384/100 |
| 7,131,770 | B2 | * | 11/2006 | Neumann | .................... 384/119 |
| 7,196,868 | B2 | * | 3/2007 | Asada et al. | ............. 360/98.07 |
| 2004/0126040 | A1 | | 7/2004 | Shih et al. | |
| 2004/0151410 | A1 | * | 8/2004 | Beckers | ...................... 384/119 |
| 2005/0069235 | A1 | | 3/2005 | Shih et al. | |

FOREIGN PATENT DOCUMENTS

| JP | 05111208 | A | * | 4/1993 |
| JP | 09166145 | A | * | 6/1997 |
| JP | 11-55898 | | | 2/1999 |
| JP | 11223214 | A | * | 8/1999 |
| JP | 2000014079 | A | * | 1/2000 |
| JP | 2000060055 | A | * | 2/2000 |
| JP | 2000352415 | A | * | 12/2000 |
| JP | 2005127514 | A | * | 5/2005 |

* cited by examiner

*Primary Examiner*—Marcus Charles
(74) *Attorney, Agent, or Firm*—Winston Hsu

(57) ABSTRACT

A hydrodynamic bearing assembly (10) includes a bearing sleeve (11) defining a receiving chamber (113) therein, a bearing (12) received in the receiving chamber of the bearing sleeve, a sealing cover (15) mounted to an open end (112) of the bearing sleeve and including an enlarged section (153) adjacent to the bearing, a shaft (13) extending through the sealing cover and rotatably disposed in the bearing, on which a plurality lubricant pressure generating grooves are defined, and a lubricant retaining space (117) defined by the enlarged section of the sealing cover, an end of the bearing and the shaft for receiving lubricant therein. One of the sealing cover and the shaft defines a groove (134) therein, while the other one of the sealing cover and the shaft extends a flange (156) into the groove.

17 Claims, 3 Drawing Sheets

HYDRODYNAMIC BEARING ASSEMBLY

CROSS-REFERENCES TO RELATED APPLICATION

This application is related co-pending to U.S. patent application Ser. No. 11/308,471, filed on Mar. 28, 2006, assigned to the same assignee as this application, and entitled "HYDRODYNAMIC BEARING ASSEMBLY". The disclosure of the above-identified co-pending application is incorporated herein by reference.

FIELD OF THE INVENTION

The present invention relates generally to bearing assemblies, and more particularly to a bearing assembly of hydrodynamic type.

DESCRIPTION OF RELATED ART

Due to the ever growing demand for quiet, low-friction rotational elements with extended lifetimes, hydrodynamic bearing assemblies have become increasingly used in conventional motors such as fan motors or HDDs (Hard disk drives) motors.

A typical hydrodynamic bearing assembly comprises a bearing surface which defines a bearing hole, and a shaft rotatably received in the bearing hole with a gap formed between the bearing surface of the bearing and an outer surface of the shaft, wherein this gap is filled with lubricating oil. Hydrodynamic pressure generating grooves are provided in either the bearing surface of the bearing assembly or the outer surface of the shaft. When the shaft rotates, the lubricant is driven to rotate with the shaft due to the mobility of the lubricant. A lubricating film is thus formed in the gap by means of hydrodynamic action of the hydrodynamic pressure generating grooves, so as to support the shaft without direct contact between the shaft and the bearing surface.

In operation of the bearing assembly, the rotating shaft generates a counterforce on the surrounding lubricant which supports the shaft whilst it rotates in the bearing hole. The counterforce presses the lubricant to move toward open ends of the bearing assembly along the hydrodynamic pressure generating grooves. This causes lubricant leakage from the bearing assembly. The leakage of the lubricant from the bearing assembly results in a failure of generation of the hydrodynamic pressure and an increase in abrasion between the bearing surface and the shaft, thus reducing the working life of the bearing assembly.

For the foregoing reasons, there is a need for a hydrodynamic bearing assembly which eliminates or greatly reduces lubricant leakage.

SUMMARY OF INVENTION

The present invention relates to a hydrodynamic bearing assembly for a motor such as a fan motor or a HDD motor. According to a preferred embodiment of the present invention, the hydrodynamic bearing assembly includes a bearing sleeve defining a receiving chamber therein, a bearing received in the receiving chamber of the bearing sleeve, a sealing cover mounted to an open end of the bearing sleeve and including an enlarged section adjacent to the bearing, a shaft extending through the sealing cover and rotatably disposed in the bearing, on which a plurality lubricant pressure generating grooves are defined, and a lubricant retaining space defined by the enlarged section of the sealing cover, an end of the bearing and the shaft for receiving lubricant therein. One of the sealing cover and the shaft defines a groove therein, while the other one of the sealing cover and the shaft extends a flange into the groove.

Other advantages and novel features of the present invention will become more apparent from the following detailed description of preferred embodiment when taken in conjunction with the accompanying drawings, in which:

DETAILED DESCRIPTION

Figure 1:
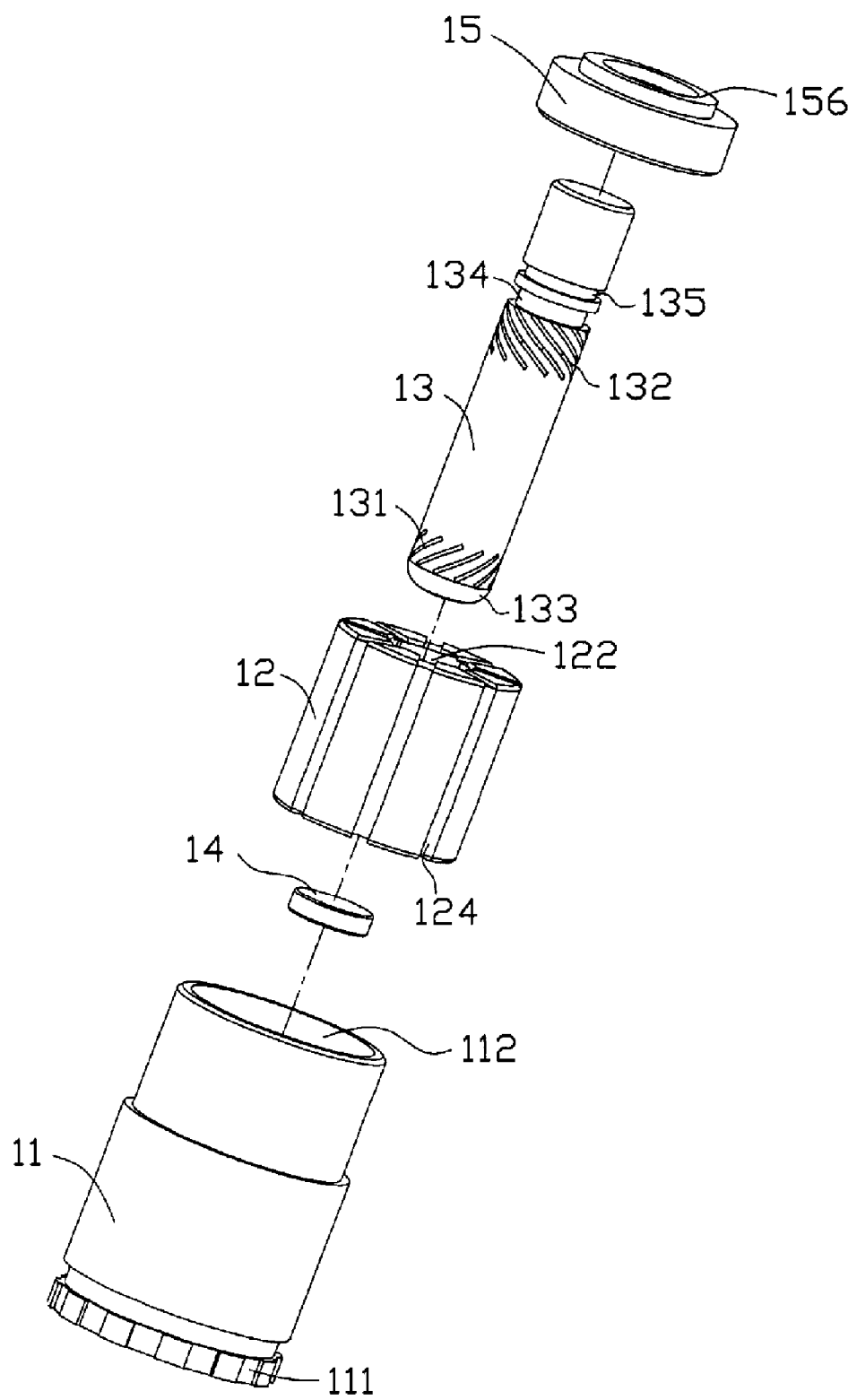
FIG. 1 is an exploded, isometric view of a hydrodynamic bearing assembly according to a preferred embodiment of the present invention.
Figure 2:
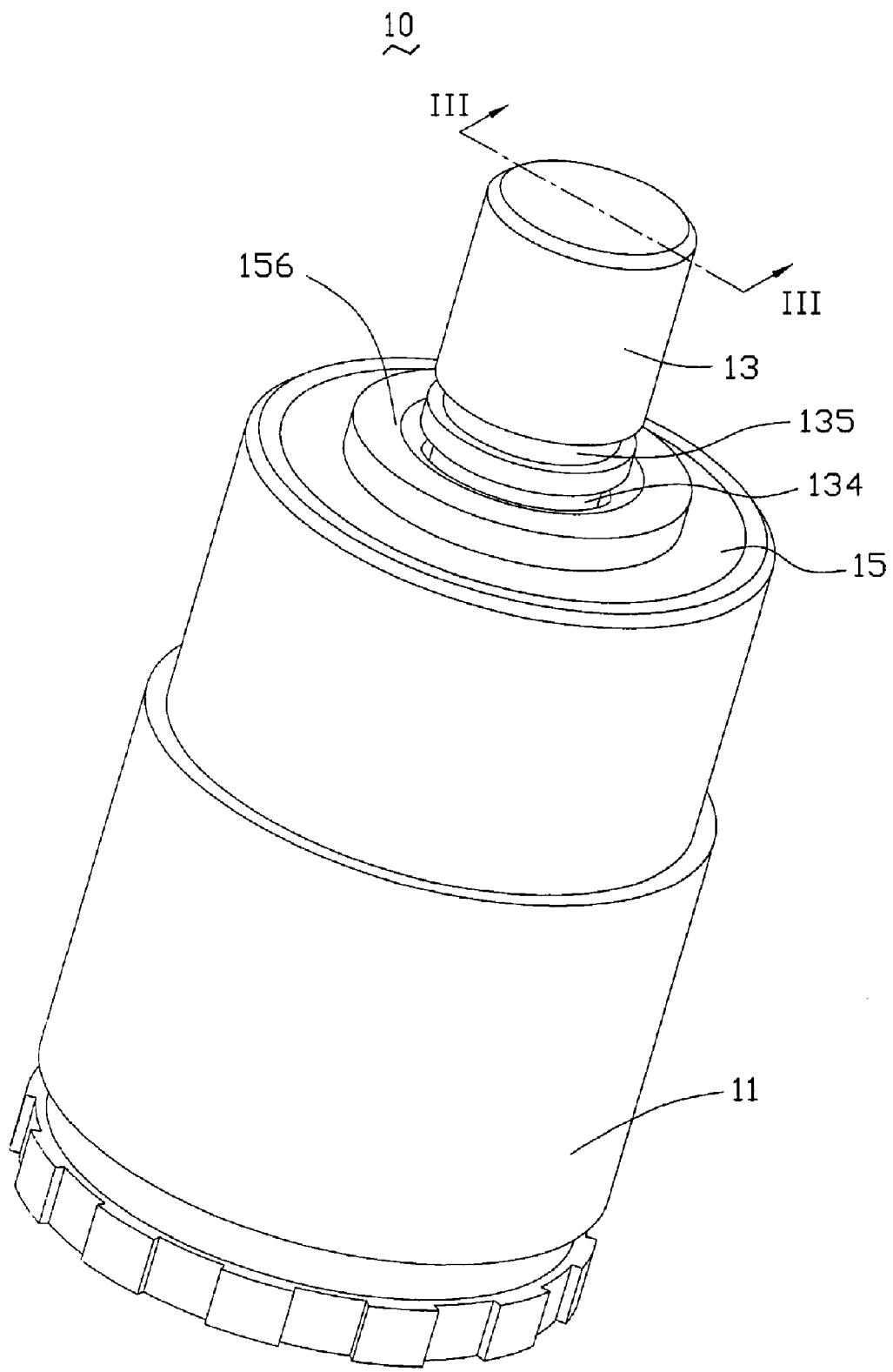
FIG. 2 is an assembled view of FIG. 1.
Figure 3:
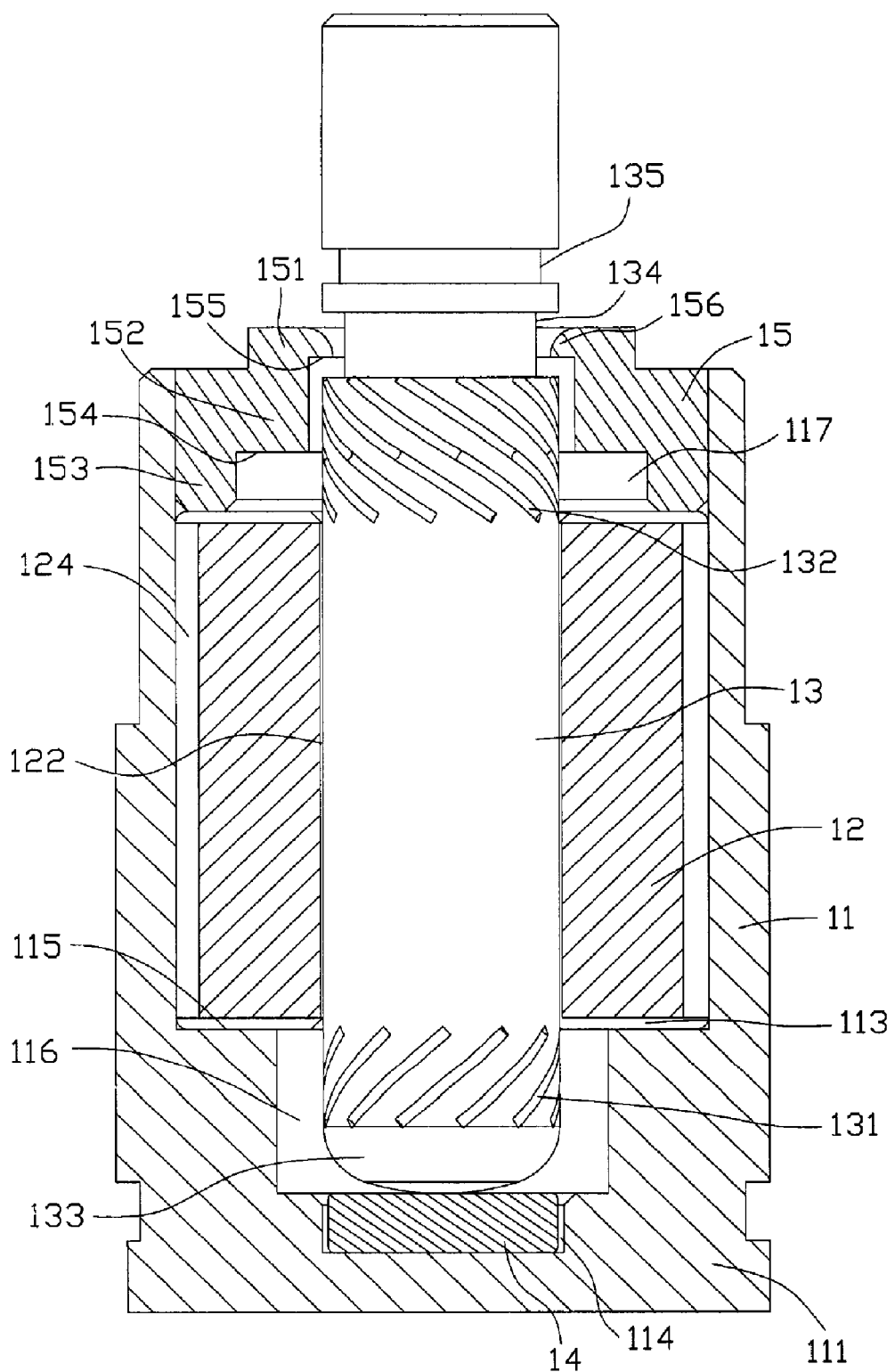
FIG. 3 is a cross-sectional view of FIG. 2, taken along line III-III thereof.

Referring to FIGS. 1 through 3, a hydrodynamic bearing assembly 10 according to a preferred embodiment of the present invention is shown. The bearing assembly 10 includes a bearing sleeve 11, a ceramic bearing 12 disposed in the bearing sleeve 11, a shaft 13 rotatably received in a bearing hole 122 of the bearing 12, a thrust washer 14 abutting against a bottom distal end of the shaft 13, a sealing cover 15 disposed at a top portion of the shaft 13, and lubricant (not shown) filled in spaces formed between an inner surface of the bearing 12 and an outer surface of the shaft 13.

Particularly referring to FIG. 3, the bearing sleeve 11 has a generally U-shaped cross section with a bottom end thereof being closed, thereby defining a closed end 111 at the bottom end thereof and an open end 112 (labeled in FIG. 1) at a top end thereof. A receiving chamber 113 is defined in the bearing sleeve 11 for enclosing a variety of components therein. The thrust washer 14, the bearing 12 and the sealing cover 15 are disposed one on top of the other in that order in the receiving chamber 113. The shaft 13 is inserted into the bearing hole 122 of the bearing 12 after the variety of components are received in the receiving chamber 113. A circular-shaped notch 114 is defined at the closed end 111 of the bearing sleeve 11, for receiving the thrust washer 14 therein. A contacting surface 115 is formed above and spaced at a distance from the notch 114 for supporting a bottom end of the bearing 12.

The shaft 13 defines a plurality of spiral shaped first and second lubricant pressure generating grooves 131, 132 in the outer surface thereof for generation of lubricant pressure. The first and second lubricant pressure generating grooves 131, 132 are respectively disposed adjacent to bottom and top ends of the shaft 13, and extend from the bottom and top ends of the shaft 13 toward a middle portion thereof along different spinning directions. As the bearing assembly 10 is activated, the first and second lubricant pressure generating grooves 131, 132 guide the lubricant adjacent to the bottom and top ends of the shaft 13 toward the middle portion thereof, generating the lubricating pressure which supports the shaft 13 without radial contact between the shaft 13 and the bearing 12.

The shaft 13 includes a dome-shaped supporting portion 133 at the bottom distal end thereof to abut against the thrust washer 14, and defines spaced first and second annular grooves 134, 135 at the top portion thereof. The first annular groove 134 locates adjacent to and communicates with the second lubricant pressure generating grooves 132, while the second annular groove 135 is located at a distance above the first annular groove 134 and the second lubricant pressure generating grooves 132. A rotor (not shown) such as an impeller is fixed to the shaft 13 via the engagement between the rotor and the second annular groove 135 of the shaft 13, to drive the rotation of the shaft 13 in the bearing hole 122 of the bearing 12.

The thrust washer 14 is disposed in the notch 114 of the bearing sleeve 11, for axially supporting the supporting portion 133 of the shaft 13. The thrust washer 14 consists of a resin or any other appropriately smooth material, so as to reduce the friction against the supporting portion 133 of the shaft 13.

The bearing 12 is disposed in the bearing sleeve 11, with the bottom end of the bearing 12 intimately contacting with the contacting surface 115 of the bearing sleeve 11. A first lubricant retaining space 116 is formed between the shaft 13, the thrust washer 14 and the bottom end of the bearing 12. The first lubricant pressure generating grooves 131 are received in the first lubricant retaining space 116, making the first lubricant pressure generating grooves 131 extend below the bottom end of the bearing 12. As the bearing assembly 10 is activated, the lubricant in the first lubricant retaining space 116 is driven upwardly toward the middle portion of the shaft 13 along the first lubricant pressure generating grooves 131, thus generating lubricant pressure. A diameter of the bearing hole 122 is greater than a diameter of the shaft 13 in the bearing hole 122, so that the lubricant is filled therebetween. A plurality of lubricant returning grooves 124 are defined in an outer periphery wall of the bearing 12, for facilitating the flow of the lubricant from a top end of the bearing 12 downwardly toward the bottom end thereof. Furthermore, the lubricant returning grooves 124 facilitate air retained in the bearing sleeve 11 to leave therefrom via the open end 112 of the bearing sleeve 11, as the shaft 13 is inserted into the bearing hole 122 of the bearing 12.

The sealing cover 15 is an O-ring made of resilient materials. The sealing cover 15 is mounted to the open end 112 of the bearing sleeve 11, with a circumference of the sealing cover 15 interferentially engaging with an inner surface of the bearing sleeve 11. When the sealing cover 15 is mounted to the bearing sleeve 11, a bottom end of the sealing cover 15 and the contacting surface 115 of the bearing sleeve 11 respectively abut against the top and bottom ends of the bearing 12, for axially locating the bearing 12 in the receiving chamber 113 of the bearing sleeve 11.

The sealing cover 15 defines a step hole (not labeled) at a middle portion thereof allowing the shaft 13 to extend therethrough. The step hole divides the sealing cover 15 into three sections, i.e. a bottom section 153 adjacent to the bearing 12, a top section 151 distant from the bearing 12, and a medium section 152 located between the bottom and the top sections 153, 151. When the sealing cover 15 is mounted to the bearing sleeve 11, the top section 151 of the sealing cover 15 protrudes from the open end 112 of the bearing sleeve 11 and extends in the first annular groove 134 of the shaft 13.

Diameters of inner walls of the top, the medium and the bottom sections 151,152,153 are successively increased, thereby forming two step-surfaces 154, 155 between two adjacent sections thereof. When the lubricant goes upwardly toward the open end 112 of the bearing sleeve 11, it may impinge on the step-surfaces 154, 155 of the sealing cover 15 and then moves downwardly toward the closed end 111 of the bearing sleeve 11. This lessens the lubricant leakage from the sealing cover 15. Alternatively, the step hole may divide the sealing cover 15 into more sections, whose inner wall diameters are successively increased from a top end of the sealing cover 15 toward the bottom end thereof. More step-surfaces are thus formed on the sealing cover 15, which further lessen the lubricant from leakage from the sealing cover 15.

A diameter of the inner wall of the top section 151 of the sealing cover 15 is greater than that of the shaft 13 at the first annular groove 134, but less than that of the shaft 13 at upper and under sides of the first annular groove 134. A flange 156 is therefore formed at the top end of the sealing cover 15, which extends into the first annular groove 134 of the shaft 13. The step-surface 155 is formed at a bottom surface of the flange 156. When the shaft 13 moves upwardly, the flange 156 engages with the shaft 13 below the first annular groove 134, thereby preventing the shaft 13 from axially coming off the bearing assembly 10. Moreover, the bottom surface of the flange 156 prevents lubricant leakage from the bearing assembly 10, and a top surface of the flange 156 prevents outside dust from entering into the bearing sleeve 11 which may contaminate the lubricant. Alternatively, the flange may extend from the shaft, while the first annular groove may be defined in the sealing cover. Under this status, the first annular groove may be defined in the middle section of the sealing cover.

A diameter of the inner wall of the bottom section 153 of the sealing cover 15 is greater than that of the shaft 13 thereat, thereby forming a second lubricant retaining space 117 between the shaft 13, the top end of the bearing 12 and the bottom section 153 of the sealing cover 15. The second lubricant retaining space 117 communicates with the first lubricant retaining space 116 via the lubricant returning grooves 124. One portion of the second lubricant pressure generating grooves 132 extends into the second lubricant retaining space 117, making the portion of the second lubricant pressure generating grooves 132 extend above the top end of the bearing 12. When the bearing assembly 10 is activated, the lubricant in the second lubricant retaining space 117 is driven down toward the middle portion of the shaft 13 along the second lubricant pressure generating grooves 132 for generation of the lubricant pressure.

In operation of the bearing assembly 10, the lubricant in the first and second lubricant retaining spaces 116, 117 is driven with the rotating shaft 13 due to the mobility of the lubricant, and moves toward the middle portion of the shaft 13 along the first and second lubricant pressure generating grooves 131, 132. The lubricant pressure is thus formed between the outer surface of the shaft 13 and the inner surface of the bearing 12 by means of hydrodynamic action of the first and second lubricant pressure generating grooves 131, 132. The lubricant pressure supports the shaft 13 without radial contact between the shaft 13 and the bearing 12. Simultaneously, the rotating shaft 13 presses the lubricant at the middle portion of the shaft 13 toward the first and second lubricant retaining spaces 116, 117. The lubricant in the second lubricant retaining space 117 is partly driven to the middle portion of the shaft 13, and partly goes to the first lubricant retaining space 116 via the lubricant returning grooves 124 to meet the lubricant in the first lubricant retaining space 116. The lubricant in the first lubricant retaining space 116 is driven toward the middle portion of the shaft 13 and then pressed towards the first and second lubricant retaining spaces 116, 117 to form a flow cycle in the bearing assembly 10.

In the present invention, the sealing cover 15 prevents the shaft 13 from axially coming off the bearing assembly 10, due to the engagement between the flange 156 of the sealing cover 15 and the shaft 13 below the first annular groove 134. The bottom end of the sealing cover 15 unites the contacting surface 115 of the bearing sleeve 11 to axially hold the bearing 12 in the receiving chamber 113 of the bearing sleeve 11. Furthermore, the sealing cover 15 prevents lubricant leakage from the bearing assembly 10 via the step-surfaces 154, 155, and prevents outside dust from entering into the bearing sleeve 11 via the top surface of the flange 156. So there is enough lubricant filled in the bearing sleeve 11 to support the shaft 13 without radial contact between the shaft 13 and the bearing 12. In this way the working life of the bearing assembly 10 is increased.

Compared to the conventional art, the hydrodynamic bearing assembly 10 according to the present embodiment has many advantages. The bottom end of bearing sleeve 11 is closed, which prevents the lubricant from leakage from the closed end 111 of bearing sleeve 11. The lubricant returning grooves 124 help the lubricant in the second lubricant retaining space 117 to timely move downwards toward the first lubricant retaining space 116. So the lubricant does not build up in the second lubricant retaining space 117, thereby reducing the possibility of the leakage of the lubricant from the open end 112 of bearing sleeve 11. The first and second lubricant pressure generating grooves 131, 132 guide the lubricant in the first and second lubricant retaining spaces 116, 117 to move towards the middle of the shaft 13. This reduces the amount of the lubricant in the second lubricant retaining space 117, further preventing lubricant leakage from the open end 112 of the bearing sleeve 11. In addition, the thrust washer 14 reduces the friction between the shaft 13 and the bottom end of the bearing sleeve 11, thereby increasing the lifetime of the bearing assembly 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hydrodynamic bearing assembly comprising:
a bearing sleeve defining a receiving chamber therein;
a bearing received in the receiving chamber of the bearing sleeve and defining a bearing hole in the bearing;
a sealing cover mounted to an open end of the bearing sleeve and comprising an enlarged section adjacent to the bearing;
a shaft rotatably disposed in the bearing hole of the bearing and extending through the sealing cover, on which a plurality lubricant pressure generating grooves are defined; and
a lubricant retaining space defined by the enlarged section of the sealing cover, an end of the bearing and the shaft for receiving lubricant therein, wherein one of the sealing cover and the shaft defines a groove therein, the other one of the sealing cover and the shaft extends a flange into the groove;
wherein a portion of the lubricant pressure generating grooves extends into the lubricant retaining space and above the bearing hole of the bearing.

2. The hydrodynamic bearing assembly as described in claim 1, wherein the sealing cover defines a step hole therein for allowing the shaft to extend therethrough, the step hole divides the sealing cover into a plurality of sections, the enlarged section is disposed at a bottom end of the sealing cover.

3. The hydrodynamic bearing assembly as described in claim 2, wherein diameters of inner walls of the portions are successively increased from a top end of the sealing cover toward the bottom end thereof, forming a plurality of step-surfaces between two adjacent portions thereof.

4. The hydrodynamic bearing assembly as described in claim 2, wherein the groove is defined in the shaft, a diameter of an inner wall of a top section of the sealing cover is greater than that of the shaft at the groove, but less than that of the shaft at upper and under sides of the groove.

5. The hydrodynamic bearing assembly as described in claim 1, wherein a diameter of an inner wall of the enlarged section of the sealing cover is greater than an outer diameter of the shaft at the enlarged section of the sealing cover.

6. The hydrodynamic bearing assembly as described in claim 1, wherein an opposite end of the bearing at a distance from a bottom inner surface of the bearing sleeve, another lubricant retaining space is formed between the shaft, the bottom inner surface of the bearing sleeve, and the opposite end of the bearing, the shaft defines a plurality of other lubricant pressure generating grooves extending into the another lubricant retaining space, driving the lubricant in the other lubricant retaining space toward the middle portion of the shaft.

7. The hydrodynamic bearing assembly as described in claim 6, wherein the lubricant pressure generating grooves and the another lubricant pressure generating grooves extend from ends of the shaft toward the middle portion thereof along different spinning directions.

8. The hydrodynamic bearing assembly as described in claim 6, wherein the bearing defines a plurality of lubricant returning grooves in an outer periphery wall thereof, the lubricant returning grooves interlinik the lubricant retaining space with the another lubricant retaining space so as to facilitate the movement of the lubricant in the lubricant retaining space toward the other lubricant retaining space.

9. The hydrodynamic bearing assembly as described in claim 1, wherein the bearing is made of ceramic material.

10. A hydrodynamic bearing assembly comprising:
a bearing sleeve with a bottom end thereof being closed and a top end thereof being opened;
a bearing received in the bearing sleeve;
a sealing cover mounted to the open end of the bearing sleeve, and defining a step hole therein; and
a shaft extending through the step hole of the sealing cover and rotatably disposed in the bearing, on which a plurality of lubricant pressure generating grooves are defined, wherein the shaft at the open end of the bearing sleeve defines a groove therein, the sealing cover extends a flange at a top end thereof for engagingly received in the groove of the shaft;
wherein the sealing cover comprises an enlarged bottom section adjacent to the bearing, a diminished top section distant from the bearing, and a medium section located between the bottom and the top sections, the flange extends from the top section toward the groove of the shaft, a lubricant retaining space is defined by the bottom section of the sealing cover, the shaft and a top end of the bearing; and
wherein the bearing sleeve comprises a contacting surface abutting against a bottom end of the bearing, the contacting surface unites a bottom end of the sealing cover which abuts against a top end of the bearing, to axially locating the bearing in the receiving chamber of the bearing sleeve.

11. The hydrodynamic bearing assembly as described in claim 10, further comprising a thrust washer disposed at the closed end of the bearing sleeve and spaced a distance with the contacting surface, another lubricant retaining space being defined by the shaft, the thrust washer and the bottom end of the bearing.

12. The hydrodynamic bearing assembly as described in claim 11, wherein the shaft defines two groups of spiral shaped lubricant pressure generating grooves at two opposite ends thereof, which extending into the lubricant retaining space and the another lubricant retaining space, respectively, along different spinning directions.

13. The hydrodynamic bearing assembly as described in claim 11, wherein the bearing defines a plurality of lubricant returning grooves in an outer periphery wall thereof, the lubricant returning grooves interlinik the lubricant retaining space with the another lubricant retaining space for facilitating the circulation of lubricant in the bearing assembly.

14. A hydrodynamic bearing assembly comprising:
   a bearing sleeve having a closed bottom end, an open top end, a chamber between the open and closed ends and a contacting surface in the chamber and above the bottom end;
   a wear-resistant element received in the bottom end of the bearing sleeve;
   a bearing received in the chamber on the contacting surface; and
   a shaft rotatably mounted in the bearing, having a bottom end engaging with the wear-resistant element, the shaft forming lubricant pressure generating grooves in upper and lower ends of an outer surface thereof, the lubricant pressure generating grooves being located above and below the bearing; and
   a cover covering the opened end of the bearing sleeve, the cover having a stepped inner surface around the upper end of the shaft on which the lubricant pressure generating grooves are defined.

15. The hydrodynamic bearing assembly as described in claim 14, wherein the shaft defines an annular groove above the upper end of the shaft on which the lubricant pressure generating grooves are defined, and the cover has a flange extending in the annular groove.

16. The hydrodynamic bearing assembly as described in claim 15, wherein the bearing defines a plurality of lubricant returning grooves in an outer periphery surface thereof.

17. The hydrodynamic bearing assembly as described in claim 16, wherein a first lubricant retaining space is defined by the chamber below the bearing and a second lubricant retaining space is defined by the chamber above the bearing, the first and second lubricant retaining spaces communicating with each other via the lubricant returning grooves.

* * * * *